United States Patent
Lipp et al.

(10) Patent No.: US 10,604,822 B2
(45) Date of Patent: Mar. 31, 2020

(54) PROCESSES FOR METAL IONS REMOVAL FROM AQUEOUS SOLUTIONS

(71) Applicant: Eyal Hahn, Tel Aviv (IL)

(72) Inventors: Jonathan Lipp, Givat Avni (IL); Baruch Grinbaum, Tivon (IL)

(73) Assignee: Eyal Hahn, Tel Aviv (IL)

( * ) Notice: Subject to any disclaimer, the term of this patent is extended or adjusted under 35 U.S.C. 154(b) by 0 days.

(21) Appl. No.: 14/355,758

(22) PCT Filed: Nov. 1, 2012

(86) PCT No.: PCT/IL2012/050435
§ 371 (c)(1),
(2) Date: May 1, 2014

(87) PCT Pub. No.: WO2013/065050
PCT Pub. Date: May 10, 2013

(65) Prior Publication Data
US 2014/0322110 A1 Oct. 30, 2014

Related U.S. Application Data

(60) Provisional application No. 61/555,024, filed on Nov. 3, 2011.

(51) Int. Cl.
C22B 26/12 (2006.01)
C22B 3/26 (2006.01)

(52) U.S. Cl.
CPC ............ *C22B 26/12* (2013.01); *C22B 3/0005* (2013.01); *Y02P 10/234* (2015.11)

(58) Field of Classification Search
None
See application file for complete search history.

(56) References Cited

U.S. PATENT DOCUMENTS

| | | | |
|---|---|---|---|
| 3,479,147 A * | 11/1969 | Lee | C01D 15/00 423/179.5 |
| 3,793,433 A | 2/1974 | Seeley et al. | |
| 4,455,234 A * | 6/1984 | Markham | B01D 11/0488 210/638 |
| 7,799,294 B2 * | 9/2010 | Kordosky | C22B 3/0005 423/24 |
| 8,328,900 B2 * | 12/2012 | Bednarski | C22B 3/0005 423/54 |

FOREIGN PATENT DOCUMENTS

| | | | |
|---|---|---|---|
| WO | WO 2006/029439 A1 | 3/2006 | |
| WO | WO 2008157275 A1 * | 12/2008 | ........ C01G 23/001 |
| WO | 2009/038962 A1 | 3/2009 | |

OTHER PUBLICATIONS

The International Search Report and Written Opinion (PCT/ISA/220, PCT/ISA/210, and PCT/ISA/237) for International Application No. PCT/IL2012/050435, 16 pages, dated Apr. 16, 2013.
Lee et al., "Solvent Extraction of Lithium", J. inorg. nucl. Chem., vol. 30, pp. 2807-2821, (1968).
Moyer et al., "Equilibria and Effect of Diluent in the Solvent Extraction of Lithium Salts by Highly Alkylated 14-Crown-4 Ethers", Proceedings of the International Solvent Extraction Conference ISEC '96, held Mar. 17-21, 1996, in Melbourne, Australia, 8 pages, (1996).
Seeley et al., "Extraction of Lithium from Neutral Salt Solutions with Fluorinated β-Diketones", J. inorg. nucl. Chem., vol. 38, pp. 1049-1052, (1976).
Tsuchiya et al., "Highly Efficient Separation of Lithium Chloride from Seawater", J. Am. Chem. Soc., vol. 124, pp. 4936-4937, (2002).

* cited by examiner

*Primary Examiner* — Melissa S Swain
(74) *Attorney, Agent, or Firm* — Mark S. Cohen; Pearl Cohen; Zedek Latzer Baratz LLP

(57) ABSTRACT

Provided are continuous methods and processes for removing Li ions from an aqueous feed solution.

7 Claims, No Drawings

PROCESSES FOR METAL IONS REMOVAL FROM AQUEOUS SOLUTIONS

FIELD OF THE INVENTION

This invention relates to continuous methods and processes for the removal of metal ions from aqueous liquid solutions at high degrees of ion purity and yield.

BACKGROUND OF THE INVENTION

Separation of metal ions from aqueous solutions, such as for example Li ions, are performed by solvent extraction techniques which may be designed to be quantitative and/or selective. Such separations are accomplished by forming a readily extractable adduct of a metal ion chelate.

Lee D. A. et al. (*J. Inorg. Nucl. Chem.* 30, 2807-2821 (1968)) describes quantitative and selective extraction of lithium ions from aqueous metal solutions of alkali metal salts using dibenzoylmethane and trioctylphosphine oxide. Furthermore, Seeley F. G. and Baldwin W. H. (*J. Inorg. Nucl. Chem.* 38, 1049-1052 (1976)) report lithium extractions from near-neutral aqueous solutions of alkali metal salts, by the formation of a trioctylphosphine oxide adduct of a lithium chelate of a fluorinated beta-diketone, which was extracted into an organic diluent.

U.S. Pat. No. 3,479,147 discloses a liquid-liquid extraction method of separating lithium from other alkali metals, wherein an alkaline aqueous phase containing lithium ions was contacted with an organic solvent containing a mixture of (1) a chelating agent selected from beta-diketones and analogs thereof wherein the oxygen atoms in the beta-diketones have been replaced with nitrogen, phosphorus, or sulfur atoms, and (2) a solvating ligand such as amines and organophosphorus compounds. This mixture was reported to preferentially extract lithium ions from the aqueous phase.

Until now there has been no continuous closed loop processes in the art for the separation and removal of Li ions from aqueous liquid solutions in which purification steps have been employed, elevating the ion purity of the separated metal ion and able to regenerate the organic extracting solutions so that the method is made cost-effective in both medium and large scale production.

SUMMARY OF THE INVENTION

In one aspect the invention provides a continuous method of removing Li ions from an aqueous feed solution comprising the steps of:
(a) Mixing said aqueous feed solution with an extracting organic solution comprising at least one organic diluent, at least one phosphine oxide and at least one proton donating agent under basic pH, thereby extracting said Li ions into said organic solution;
(b) Stripping said organic solution comprising extracted Li ions, thereby removing Li ions from said organic solution;
(c) Combining remaining aqueous solution from step (a) and stripped organic solution of step (b), thereby regenerating said extracting organic solution and recycling said solution in step (a).

The term "aqueous feed solution" relates to any aqueous solution comprising any amount (detectable or undetectable using art known measuring instrumentation) of lithium ions and other components such as for example other alkali metal ions (e.g. at least one ion of sodium, potassium, rubidium and caesium) at any amount. The components of said aqueous feed solution may be solubilized, partially solubilized and/or unsolubilized in said solution. Aqueous feed solution can be saturated, partially saturated or diluted with said ionic components.

Aqueous feed solution can be of any source including natural source (such as for example of any marine type source, including sea, ocean, brine pools, seabed, seafloor, ocean floor etc, salinated lakes, underground water source, and so forth), industrial source (such as for example, battery recycle stream, residual water from any type of industrial processes, investigative laboratories, medical laboratories, medical institutions), household source (including sanitary water sources), agricultural source and any other type of waste water sources.

Non-limiting examples of waste water sources include: recreation water facilities, swimming pools and spas, cooling systems, water-intensive industries such as the paper industry, wastewater and effluents, air conditioning systems, hot and cold closed water systems, aquaculture such as fish-ponds, soil-less (hydroponic) agriculture, greenhouses, etc.

In some embodiments said aqueous feed solution is brine of Li containing lakes or ponds (salars).

According to the first aspect the method of the invention is capable of continuously removing Li ions from said aqueous feed solution containing (at least about) 1 ppm Li and above (i.e. for example 1 ppm, 2 ppm, 3 ppm, 4 ppm, 5 ppm, 10 ppm and so forth). The removal and separation of Li ions from said aqueous feed solution is quantitative and selective. Thus, in some embodiments the method of the present invention provides an output of aqueous solution comprising Li ions having a Li ionic purity of at least 75% (i.e. at least 75% of all the ions in the resultant aqueous solution are Li ions). In other embodiments, the method of the invention provides an output of aqueous solution comprising Li ions having an ionic purity of between about 75%, 80%, 85%, 90%, 95%, 96%, 97%, 98%, 99% to about 99.999%.

In the first step of a method of the invention, a liquid-liquid extraction process of the Li ions is performed when said aqueous feed solution is mixed with an immiscible extracting organic solution comprising at least one organic diluent, at least one phosphine oxide and at least one proton donating agent. It is to be noted that said components of said extracting organic solution are added to mixture either together, as a single organic phase or separately (thus forming an organic phase in the mixture itself).

In other embodiments of the invention said at least one phosphine oxide has a general formula (I):

wherein each of $R^1$, $R^2$ and $R^3$ is independently selected from straight or branched $C_1$-$C_{10}$ alkyl, straight or branched $C_2$-$C_{10}$ alkenyl, straight or branched $C_2$-$C_{10}$ alkynyl, optionally substituted $C_5$-$C_{12}$ aryl, optionally substituted $C_4$-$C_{12}$ heteroaryl.

The term "straight or branched $C_1$-$C_{10}$ alkyl" encompasses a hydrocarbon straight or branched saturated chain having 1, 2, 3, 4, 5, 6, 7, 8, 9 or 10 carbon atoms having one valency available for bonding to the P atom of a compound of formula (I). When said alkyl comprises more than 3 carbon atoms, this term may also include cycloalkyl moieties.

The term "straight or branched $C_2$-$C_{10}$ alkenyl" encompasses a hydrocarbon straight or branched chain having 2, 3, 4, 5, 6, 7, 8, 9 or 10 carbon atoms having at least one double bond on said straight or branched chain and one valency available for bonding to the P atom of a compound of formula (I). When said alkenyl comprises more than 3 carbon atoms, this term may also include cycloalkeyl moieties.

The term "straight or branched $C_2$-$C_{10}$ alkynyl" encompasses a hydrocarbon straight or branched chain having 2, 3, 4, 5, 6, 7, 8, 9 or 10 carbon atoms having at least one triple bond on said straight or branched chain and one valency available for bonding to the P atom of a compound of formula (I). When said alkynyl comprises more than 3 carbon atoms, this term may also include cycloalkynyl moieties.

The term "optionally substituted $C_5$-$C_{12}$ aryl" encompasses an aromatic cyclic (single ring, fused or separated aromatic rings) hydrocarbon having 5, 6, 7, 8, 9, 10, 11 or 12 carbon atoms having one valency available for bonding to the P atom of a compound of formula (I).

The term "optionally substituted $C_4$-$C_{12}$ heteroaryl" encompasses an aromatic cyclic (single ring, fused or separated aromatic rings) hydrocarbon having 4, 5, 6, 7, 8, 9, 10, 11 or 12 carbon atoms having at least one heteroatom (for example N, O, S, P and so forth) on said aromatic ring and one valency available for bonding to the P atom of a compound of formula (I).

The term "optionally substituted" as used herein means that the groups in question are either unsubstituted or substituted with one or more of the substituents selected from the group consisting of halogen, hydroxy, nitro, alkyl, alkynyl, alkenyl, alkoxy, alkylsulfanyl, alkylsulfenyl, alkylsulfonyl, oxo, mercapto, amino optionally substituted by alkyl, carboxy, carbamoyl optionally substituted by alkyl, aminosulfonyl optionally substituted by alkyl, nitro, or lower perfluoroalkyl. When the groups in question are substituted with more than one substituent the substituents may be the same or different.

Non-limiting examples of phosphine oxide include trioctylphosphine oxide, Triphenylphosphine oxide, phenylbis(2, 4,6-trimethylbenzoyl)phosphine oxide, and other compounds known in the art.

In further embodiments of the invention, said at least one proton donating agent is selected from the group consisting of straight or branched $C_1$-$C_{10}$ alcohol, $C_1$-$C_{10}$ ketone, $C_1$-$C_{10}$ aldehyde, $C_3$-$C_{20}$ fatty acid, and any combination thereof.

Non-limiting examples of proton donating agent include isoamyl alcohol, glycerol, Metyl-isobutyl ketone (MIBK), organic acids and other compounds known in the art.

In some embodiments said proton donating agent is a di-ketone. Non-limiting examples of diketone include thenoyl trifluoroacetone, benzoyl acetone and other compounds known in the art.

In yet other embodiments, the molar ratio between said phosphine oxide and an organic acid in said extracting organic solution is in the range of between about 5:1 to about 1:5. In further embodiments, the molar ratio between said phosphine oxide and an organic acid in said extracting organic solution is selected from 5:1, 5:2, 5:3, 5:4, 1:1, 2:1, 1:2, 4:1, 1:4, 3:1, 3:2, 1:3, 2:3 and 1:5.

In further embodiments said at least one organic diluent includes any organic hydrocarbon solvent capable of dissolving components of extracting solution, extraction of Li ion adduct and providing maximal phase separation from aqueous solutions in the process step. Non-limiting examples of organic diluents include: dodecane, xylene, carbon tetrachloride, benzene Solvesso 100, pentanol, cresol, Isopar M, Shellsol 2046, 2-methyl-2-pentanone, di-n-amyl ether and other diluents known in the art.

Without wishing to be bound by theory, it is stipulated that under basic conditions (pH≥7), an adduct of said Li ions, phosphine oxide and proton donating agent is extracted to the organic solution. The type of said at least one phosphine oxide and at least one proton donating agent, and ratio between them controls the quantitative extraction of Li ions and the selectivity of extraction.

In some embodiments, said basic pH in step (a) is in the range of between about 7 to about 14. In some embodiments said basic conditions are achieved by the addition of basic component to either the organic or aqueous solutions in step (a). Such component is selected from any basis or basic salt, e.g. NaOH, $NH_4OH$, $(NH)_2CO_3$, $Na_2CO_3$, $NaHCO_3$, KOH, CsOH, $K_2CO_3$, $KHCO_3$ and other compounds known in the art. In further embodiments, said basic conditions are achieved through electrolysis of the feed solution.

After an effective mixing of both aqueous solution and organic extracting solution is achieved (providing the effective extraction of Li ions within less than 15 minutes), the resultant organic phase comprises an adduct of said Li ions with phosphine oxide and proton donating agent. The remaining aqueous solution comprises at least a portion of solubilized phosphine oxide, having a basic pH (pH≥7). The two phases are separated prior to proceeding with the next steps of a method of the invention.

In step (b) of a method of the invention said organic solution comprising extracted Li ions, obtained in step (a) detailed herein above, is stripped from said Li ions thereby removing Li ions from said organic solution.

The term "stripping" is meant to encompass any process that is capable of separating Li ions from an organic phase using a stripping aqueous solution. In the stripping step of a method of the invention an organic phase comprising extractable Li ions adducts resulting from step (a) of the method, is stripped of said Li ions by the use of an aqueous stripping solution having a pH capable of decomposing the Li adduct and extracting Li ions into said aqueous stripping solution.

In some embodiments, said stripping in step (b) is performed under a pH that is lower than the pH of extracting step (a) (the pH under which the extraction in step (a) was performed). In some further embodiments, said stripping step (b) is performed under acidic pH (pH≤5, it is noted that this range relates to the pH of the process). It is to be noted that said pH level is achieved by addition of at least one acidic agent to either said aqueous stripping solution or organic solution. Non-limiting examples of said at least one acidic agent includes HCl, $H_2SO_4$, $HNO_3$, $H_3PO_4$ and $CH_3COOH$.

Resulting phases of stripping step (b) include: an aqueous solution comprising Li ions having a Li ionic purity of at least 75% (as mentioned herein above), and an organic stripped solution comprising adduct components comprising at least one phosphine oxide and at least one proton donating agent.

In further embodiments a continuous method of removing Li ions from an aqueous feed solution of the invention, further comprising the step of purifying (scrubbing) organic solution comprising extracted Li ions prior to step (b).

The term "purification (scrubbing)" or any of its lingual derivatives is meant to encompass a process wherein the purity of said extracted Li ions is raised (raising also the Li ion purity in said organic solution), thus removing any contaminants such as for example additional alkali and alkali earth metal ions (e.g. sodium or calcium ions) that have been extracted to the organic solution in extraction step (a). Under this method step a scrubbing aqueous solution is mixed with said organic solution obtained in step (a), thus removing any contaminants from organic phase to said scrubbing aqueous solution.

In some embodiments, said purification is performed under a pH that is lower than the pH extraction step (a). In some further embodiments, said stripping step (b) is performed under acidic pH (pH≤7). It is to be noted that said pH level is achieved by addition of at least one acidic agent to either said aqueous scrubbing solution or organic solution. Non-limiting examples of said at least one acidic agent includes HCl, $H_2SO_4$, $HNO_3$, $H_3PO_4$ and $CH_3COOH$.

Resulting phases of scrubbing step include: an aqueous solution comprising contaminants of feed solution and an organic scrubbed solution comprising extracted Li ions from step (a) in Li ion purity that can reach 99.99% or higher (in the form of an adduct with said at least one phosphine oxide and at least one proton donating agent in said organic diluent).

In step (c) of a method of the invention remaining aqueous solution from step (a) and stripped organic solution of step (b) are combined.

The resultant two phase system is capable of extracting any phosphine oxide solubilized in remaining aqueous solution from step (a) into said stripped organic phase of step (b). Thus, the resulting (separated) organic solution of step (c) comprises all components of said extracting organic phase of step (a). The organic phase formed in step (c) is therefore recycled into step (a), allowing said method of the invention to be continuous and closed-cycled without the need for additional extracting reagents to be added before commencement of an additional Li removal cycle (cycle of steps (a)-(c) with additional scrubbing step prior to step (b)).

In a further aspect the invention provides a process comprising the steps of:
  (a) Mixing an aqueous feed solution comprising at least one metal ion with an organic solution comprising at least one organic diluent and at least one phosphine oxide under basic pH, thereby extracting said at least one metal ion into said organic solution;
  (b) Mixing remaining aqueous solution from step (a) with at least one organic carrier under acidic pH, thereby extracting at least one phosphine oxide into said carrier.

Under this aspect of the invention, phosphine oxide used in a process for removing metal ions from aqueous solutions is regenerated back into an organic phase used in the process.

In step (a) of a process of the invention an aqueous feed solution comprising metal ions is mixed with an organic solution comprising at least one organic diluent and at least one phosphine oxide. In this first step a liquid-liquid extraction process of one or more metal ions is performed when said aqueous feed solution is mixed with an immiscible organic solution comprising at least one organic diluent and at least one phosphine oxide. It is to be noted that said components of said organic solution are added to the mixture either together, as a single organic phase or separately (thus forming an organic phase in the mixture itself).

Under basic conditions (pH≥7), an adduct of said one or more metal ion and phosphine oxide is extracted to the organic solution. After an effective mixing of both aqueous solution and organic extracting solution is achieved (providing the effective extraction of one or more metal ions), the resultant organic phase comprises an adduct of said one or more metal ions with phosphine oxide. The remaining aqueous solution comprises at least a portion of solubilized (extracted) phosphine oxide, having a basic pH (pH≥7). The two phases are separated prior to proceeding with the next steps of a method of the invention.

In some embodiments, said basic pH in step (a) is in the range of between about 7, 8, 9, 10, 11, 12, 13 to about 14. In some embodiments said basic conditions are achieved by the addition of at least one basic component to either the organic or aqueous solutions in step (a). Such component is selected from any basis or basic salt, e.g. NaOH, $NH_4OH$, $(NH_4)_2CO_3$, $Na_2CO_3$, $NaHCO_3$, $K_2CO_3$, $KHCO_3$, KOH, CsOH etc. In further embodiment, said basic conditions are achieved through electrolysis of the feed solution.

In further embodiments, said organic solution in step (a) further comprises at least one proton donating agent.

In step (b) of a process of the invention remaining aqueous solution from step (a) is mixed with at least one organic carrier under acidic pH (pH≤7), thereby extracting at least one phosphine oxide (which was dissolved into aqueous solution) into said carrier.

In other embodiments, said acidic pH in step (b) is in the range of between about 0, 1, 2, 3, 4, 5, 6 to about 7. In some embodiments said acidic conditions may be achieved by the addition of at least one acidic component to either the organic or aqueous solutions in step (b). Example of such component may include, but are not limited to HCl, $H_2SO_4$, $HNO_3$, $H_3PO_4$.

In further embodiments, said at least one organic diluent and at least one organic carrier are the same. In other embodiments said organic diluent and organic carrier are different.

In other embodiments said at least one organic diluent and at least one organic carrier are each independently any organic hydrocarbon solvent capable of dissolving at least one phosphine oxide, extraction of metal ions adduct and providing maximal phase separation form aqueous solutions in the steps of a process of the invention. Non-limiting examples of organic diluents and organic carriers include: dodecane, xylene, carbon tetrachloride, benzene, Solvesso 100, pentanol, 2-methyl-2-pentanone, di-n-amyl ether, cresol, Shellsol 2046.

In some embodiments of a process of the invention, steps (a) to (b) are repeated with removed carrier comprising extracted phosphine oxide.

In some embodiments, a process of the invention further comprises the steps of:
  (a1) stripping said removed organic solution, thereby removing at least one metal ion from said organic solution;
  (a2) combining remaining organic solution with said organic carrier of step (b).

In a further aspect the invention provides a method of removing Li ions from an aqueous feed solution with high ionic purity comprising the steps of:
  (a) Mixing said aqueous feed solution with an extracting organic solution comprising an organic diluent, at least one phosphine oxide and at least one proton donating agent under basic pH, thereby extracting said Li ions into said organic solution;
  (b) Purifying (scrubbing) organic solution comprising extracted Li ions thereby increasing the Li ionic purity of extracted organic solution.

In further embodiments the Li ionic purity in said scrubbed organic solution after step (b) is at least 50%. In other embodiments the Li ionic purity is at least 70%, 80%, 85%, 90%, 99.99%.

In some embodiments a method of the invention defined above, further comprising the step of stripping said scrubbed organic solution of step (b), thereby removing Li ions from said organic solution. In some embodiments the Li ionic purity of removed Li ions after said stripping step is at least 90%. In other embodiments the Li ionic purity of removed Li ions after said stripping step is at least 95%. In yet further embodiments the Li ionic purity of removed Li ions after said stripping step is between about 95% to about 99.999% or higher.

In some embodiments said scrubbing step (b) is performed under a pH that is equal or lower than the pH in which step (a) has been performed.

In other embodiments, said stripping step is performed under a pH that is equal or lower than the pH in which step (b) has been performed.

DETAILED DESCRIPTION OF EMBODIMENTS

In order to understand the invention and to see how it may be carried out in practice, embodiments will now be described, by way of non-limiting example only.

EXAMPLE 1

A feed solution containing 0.1M Li, 1M Na and 1M K, was mixed in a phase ratio of 1:1 with and organic phase composed of 22.2 g/L 2-Thenoyltrifluoroacetone+70 g/L trioctylphosphine oxide in Xylene. The process was carried out at pH=8. After phase separation the organic phase (loaded solvent) contained 0.18 g/l Li; 0.02 g/l K and 0.03 Na. Scrubbing was performed by contacting the loaded solvent with water at a phase ratio of organic to aqueous 100:1. The resulting organic (scrubbed solvent) composed of 0.175 g/l Li; 1.5 ppm Na and 1 ppm K. After removing the organic phase, it was contacted with a stripping solution composed of aqueous HCl solution at a phase ratio of organic to aqueous 30:1. The resulting aqueous product contained 5.4 g/l of Li; 1.7 ppm of Na and 0.5 ppm K.

The invention claimed is:

1. A continuous method of removing Li ions from an aqueous feed solution, comprising the steps of:
    (a) contacting said aqueous feed solution with an extracting organic solution comprising an organic diluent, at least one phosphine oxide, and at least one proton donating agent under basic pH to obtain two separate phases: (i) an organic phase comprising extracted Li ions and (ii) an aqueous solution comprising at least a portion of said at least one phosphine oxide;
    (b) stripping said separated organic phase (i) comprising extracted Li ions obtained in step (a) to obtain two separated phases: (iii) an aqueous solution comprising Li ions removed from said organic phase and (iv) an organic stripped solution; and
    (c) combining the separated aqueous solution (ii) obtained in step (a) and the separated stripped organic solution (iv) obtained in step (b), thereby regenerating said extracting organic solution of step (a) and then recycling said solution in step (a); and
    wherein said method is continuous and closed-cycled without adding additional extracting solution before repeating steps (a) and (b).

2. The method of claim 1, wherein said basic pH in step (a) is in the range of from 7 to 14.

3. The method of claim 1, wherein said stripping in step (b) is performed at a pH that is lower than the pH of extraction step (a).

4. The method of claim 1, wherein said at least one phosphine oxide has a general formula (I),

wherein each of $R^1$, $R^2$ and $R^3$ is independently selected from straight or branched $C_1$-$C_{10}$ alkyl, straight or branched $C_2$-$C_{10}$ alkenyl, straight or branched $C_2$-$C_{10}$ alkynyl, optionally substituted $C_5$-$Cl_2$ aryl, and optionally substituted $C_4$-$C_{12}$ heteroaryl.

5. The method of claim 1, wherein said at least one proton donating agent is selected from the group consisting of straight or branched $C_1$-$C_{10}$ alcohol, $C_1$-$C_{10}$ ketone, $C_1$-$C_{10}$ aldehyde, $C_3$-$C_{20}$ fatty acid, and any combination thereof.

6. The method of claim 1, wherein the molar ratio between said phosphine oxide and said at least one proton donating agent in said extracting organic solution is in the range of from about 5:1 to 1:5.

7. The method of claim 1, further comprising after step (a) purifying the organic phase comprising extracted Li ions prior to step (b).

* * * * *